United States Patent [19]

Barthelat et al.

[11] 4,447,129

[45] May 8, 1984

[54] PERISCOPIC INSTALLATIONS WITH MULTI SIGHTING HEADS FOR SUBMARINES

[75] Inventors: Rene Barthelat, Taverny; Alain Dore, Conflans Saint Honorine, both of France

[73] Assignee: Societe D'Applications Generales D'Electricite et de Mechanique Sagem, Paris, France

[21] Appl. No.: 376,767

[22] Filed: May 10, 1982

[30] Foreign Application Priority Data

May 15, 1981 [FR] France ............................... 81 09773

[51] Int. Cl.³ ....................... G02B 23/08; G02B 23/22
[52] U.S. Cl. ................................... 350/302; 350/539; 350/541
[58] Field of Search ............................. 350/539–544, 350/502, 301, 302

[56] References Cited

U.S. PATENT DOCUMENTS 2,453,336 11/1978 Orser .................................. 350/541

FOREIGN PATENT DOCUMENTS 307097 12/1977 Fed. Rep. of Germany ...... 350/541

Primary Examiner—Jon W. Henry
Attorney, Agent, or Firm—Larson and Taylor

[57] ABSTRACT

A periscopic installation with multi sighting heads for submarines comprising: two mobile masts (1,2) carrying sighting heads (3;4) and permanently situated outside the hull (7) of the submarine whatever their position (raised or lowered); a sealing protecting structure (8) surrounding the masts; two through means (11,12) passing sealingly through the hull (7) and adapted to provide through the hull, transmission of the signals supplied by the sighting heads; two means (13,14) for receiving said signals situated inside the hull and connected respectively to the through means; a single observation post (10) situated inside the hull for observing the signals at (18); and switching means (16) inserted between the observation post and the receiving means and adapted to selectively connect the observation post with one of the receiving means.

7 Claims, 1 Drawing Figure

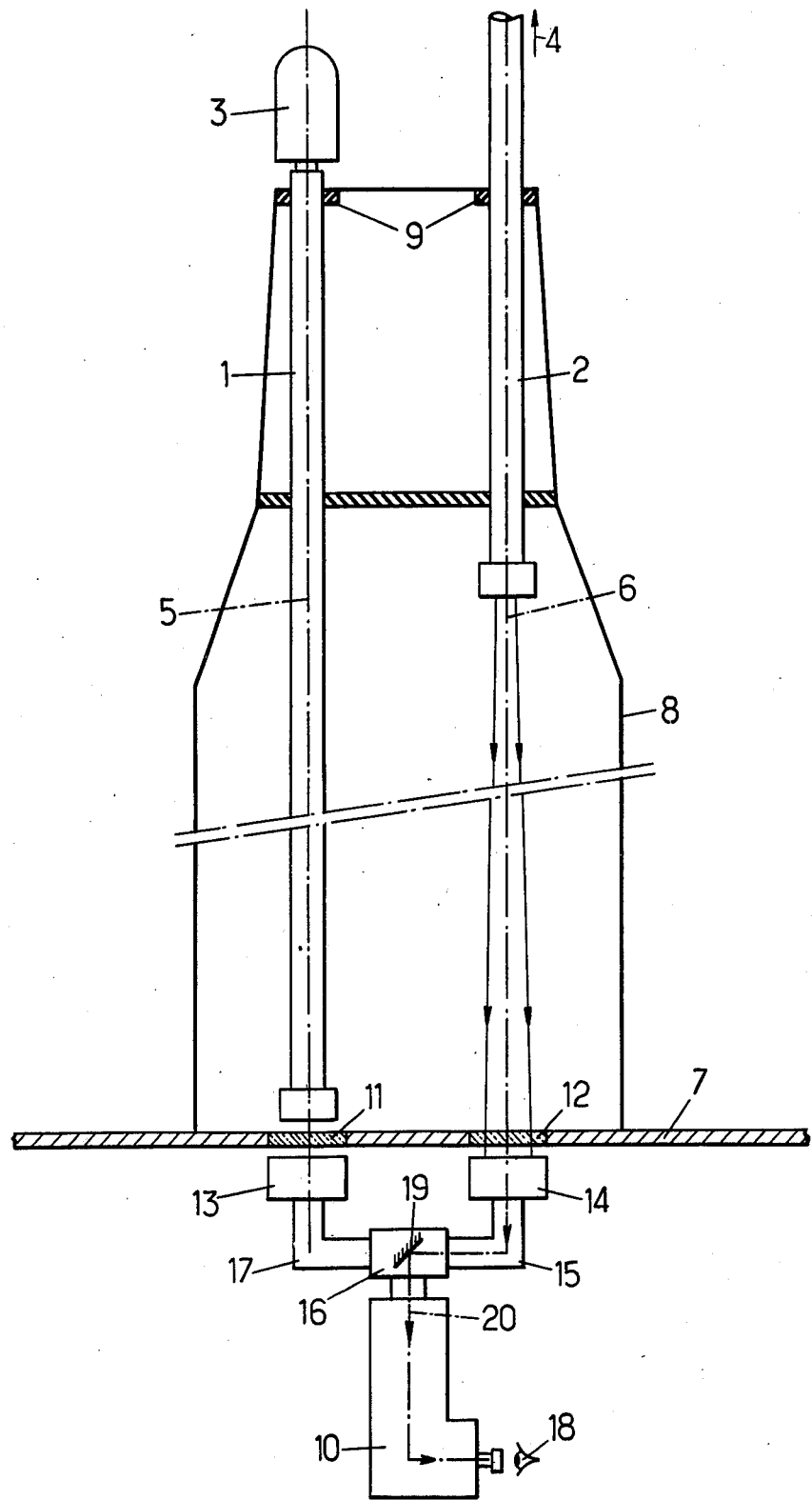

PERISCOPIC INSTALLATIONS WITH MULTI SIGHTING HEADS FOR SUBMARINES

The present invention relates to improvements to periscopic installations having several sighting heads for submarines.

Its aim is more especially to provide an arrangement which is more satisfactory in practice than presently known arrangements, which allows a saving of space inside the submarine, which provides greater safety, not only in so far as water-tightness is concerned but also from the point of view of mechanical strength, for transmitting signals between a sighting head outside the submarine and the observation post (or eyepiece) inside the submarine, these improvements being accompanied by a simplification and so economy of construction, setting up and maintenance, while providing operating qualities at least as good as those supplied by equipment used at the present time.

To these ends, in accordance with the invention, the multi sighting-head periscopic installation comprises:

at least two axially and rotatably mobile masts carrying respectively sighting heads at their upper end, these masts and respective sighting heads being permanently situated outside the hull of the submarine whatever the position (raised or lowered) of the masts, at least one sealed protecting structure surrounding the masts, this structure being sealingly connected to the hull and being arranged to allow seal sliding of the masts, at least two through means passing sealingly through the hull of the submarine and adapted to provide, through said hull, transmission of the signals supplied by the respective sighting heads, at least two receiving means for receiving the signals from the respective sighting heads, these receiving means being situated inside the hull of the submarine and connected respectively to said through means, a single observation post, situated inside the hull of the submarine and adapted to allow observation of the signals received by the receiving means, and switching means inserted between the observation post and the receiving means for selectively connecting the observation post with one of the receiving means.

An arrangement in accordance with the invention allows a periscopic installation to be provided which is much more compact than the installations with several complete periscopes used up to present.

Furthermore, the well or wells usually provided for receiving the observation post and the lower parts of the masts in the lowered position and here suppressed, which increases the strength in the low parts of the submarine and makes available free places for other purposes. Furthermore, the use of a single observation post, which may be possibly designed in the form of a fixed assembly associated with an optical compensation apparatus (or image derotator) for maintaining the image in a fixed plane for the observer when the mast with which it cooperates is rotating, allows here again considerable space-saving within the submarine.

In short, the result is generally particularly substantial saving in weight and economy of materials.

In a periscopic installation in accordance with the invention, it is particularly advantageous to use an arrangement described in a jointly filed patent applicatiion n° FR 81 09774: in this case, at least one of the through means is formed by a port-hole sealingly fixed in the hull of the submarine and made from a material transparent for the signals transmitted by the sighting head to the corresponding receiving means. In a preferred embodiment, with the signals transmitted by the sighting head being light signals, the port-hole is then made of glass.

In addition to the above-mentioned advantages, the periscopic installation of the invention provides then perfect sealing of the hull of the submarine at the position where the signals pass through said hull via the port-hole, since there is no longer need for mechanical sealed through-elements such as previously used for the sealed passage of the mast.

It is possible to provide, on the outside of the hull of the submarine, a single protection structure protecting all the masts and housing the mechanisms required for the axial and rotational movements of the masts.

Advantageously, the above-mentioned switching means comprise at least one mobile change of direction mirror.

The invention will be better understood from reading the following description of a preferred embodiment given solely by way of non limiting example; in this description reference is made to the accompanying drawing in which the single FIGURE shows very schematically a periscopic installation having two masts and two sighting heads arranged in accordance with the invention.

The installation of the invention comprises, in a known way, two periscope masts 1 and 2 carrying at their respective upper ends sighting heads 3 and 4. Masts 1 and 2 are arranged so as to be able to rotate about their respective axes 5 and 6, and so as to be able to slide axially between an inoperative position or lowered position in which the periscope is retracted and an operational position or raised position in which the sighting head is situated above the surface of the water. For the sake of simplicity, the different drive and guide control means providing the movements of the masts have not been shown.

It has been assumed, in the example shown, that each mast has its own actuating mechanism: thus, by way of example, mast 1 (on the left of the FIGURE) is shown in the lowered position, whereas mast 2 (on the right of the FIGURE) is shown in the raised position (the corresponding sighting head 4, being situated outside the drawing, is not visible).

According to an arrangement similar to the one described in the above patent applicatiion, masts 1 and 2 are located as a whole outside the thick and resistant hull 7 of the submarine and they are supported by a closed structure 8 sealingly fixed to the hull 7 of the submarine. the passageways 9 for masts 1 and 2, at the upper part of structure 8, are sealed also, so that the fittings required for actuating the masts may be housed therein. It should be noted that structure 8 is itself housed inside the conning tower of the submarine (not shown) which, during submersion, is filled with water and it withstands therefore immersion.

For observing the signals, optical or other, supplied by the sighting heads 3 or 4, an observation posts 10 is disposed inside the submarine. For conveying the signals between the sighting heads and the observation post, through hull 7, the hull is provided with port-holes 11, 12 sealingly fixed in the alignment of the axes 5 and 6 of masts 1 and 2 respectively. In the case shown where signals supplied by the sighting heads are optical light signals, port-holes 11,12 are made of glass; but of course, the material to be chosen for port-holes 11 and 12 depends above all on the nature of the signals transmitted so that the port-hole is transparent for said signals.

Inside the hull of the submarine, signal receiving apparatus 13,14 are positioned opposite the port-holes 11, 12 respectively and aligned along the axes 5 and 6 of masts 1 and 2 respectively. The receiving apparatus 13, 14 are appropriately arranged to receive and possibly process the type of signals supplied by the sighting heads 3,4 respectively. By way of example, and solely to give an idea, the sighting head 4 supplies a simple light image: apparatus 14 is then formed essentially from optical elements, more especially reflectors (not shown) which through a connection 15 reflect the light signals towards a selector apparatus 16 whose role will be explained further on. On the other hand, the sighting head 3 may be an infra-red radiation sighting head or else a television camera, receiving apparatus 13 is then adapted to decode the signals transmitted by the sighting head 3 to transform them into a visible image (for example a television receiver) and to direct them over connection 17 to the selector apparatus 16.

The selector apparatus 16 is inserted between the receiving apparatus 13,14 and the observation post 10 and its purpose is essentially to selectively direct to the observation post the signals supplied by a chosen one of the observation apparatus, in other words to ensure the effective operation, for the eyes of the observer 18, of one of the sighting heads of the installation.

Taking into account the arrangement of the receiving apparatus 13,14 and the fact that the signals to be transmitted to observation post 10 are optical light signals, the selector apparatus 16 may advantageously be formed by a sloping mirror 19. Actuating means (not shown, for example an external knob mechanically connected to the mirror) under the control of the observer allow this latter to place mirror 19 in one or other of its positions and so to select the sighting head. The light beam (shown schematically by the broken line path 20) is then picked up in the observation post 10 to present to the observer the image supplied by the sighting head (4 in the FIGURE).

Any arrangement may of course be provided for facilitating use of the installation, in particular a servo-control placing mirror 16 automatically in a suitable position for cooperating with that one of the sighting heads which is in the raised position.

As already pointed out, each mast 1,2 is assumed to be equipped with separate actuating means. It is then possible to dispose the two masts simultanteously in the raised position and, with the help of selector apparatus 16, the observer may pass instantaneously from one to the other of the images supplied by the sighting heads 3,4.

Moreover, for further space-saving inside the submarine the observation post may be designed in a fixed form (i.e. non rotatable for panoramic observation). To this end, an optical compensation apparatus or image derotator (not shown) is associated with the observation post for maintaining the image in a fixed plane for the observer when the mast, transmitting motion to its sighting head, rotates about its axis.

Of course, the observation post is not limited to visual observation by an observer; it also comprises all the image processing elements, such as photographic apparaus, television camera, display tube etc.; with the associated electronic equipment, only a single example of all these elements being provided to cooperate respectively with one or the other of the sighting heads.

The periscopic installation of the invention allows then a considerable reduction of on-board equipment and so a reduction of the weight and cost of the submarine; furthermore, it is possible to provide inside the submarine a considerable free space, which is appreciable for housing other equipment or for designing more compact submarines.

As is evident and as it follows moreover already from what has gone before, the invention is in no wise limited to those of its modes of application and embodiments which have been more especially considered; it embraces, on the contary, all variations thereof. In particular, the periscopic installation of the invention may comprise a number of masts and sighting heads greater than the number of two which has only been considered here by way of example.

We claim:

1. A periscopic installation with multi sighting heads for submarines, characterized in that it comprises:
   at least two axially and rotatably mobile masts carrying respectively sighting heads at their upper end, these masts and respective sighting heads being permanently situated outside the hull of the submarine whatever the position (raised or lowered) of the masts,
   at least one sealed protecting structure surrounding the masts, this structure being sealingly connected to the hull and being arranged so as to allow sealed sliding of the masts,
   at least two through means passing sealingly through the hull of the submarine and adapted so as to provide, through said hull, the transmission of the signals supplied by the respective sighting heads,
   at least two receiving means for receiving the signals from the respective sighting heads, these receiving means being situated inside the hull of the submarine and connected respectively to said through means,
   a single observation post situated inside the hull of the submarine and adapted to allow observation of the signals received by the receiving means,
   and switching means inserted between the observation post and the receiving means for selectively connecting the observation post with one of the receiving means.

2. The periscopic installation according to claim 1, characterized in that at least one of the through means is formed by a port-hole sealingly fixed in the hull of the submarine and made from a material transparent for the signals transmitted by the sighting head to the corresponding receiving means.

3. The periscopic installation according to claim 2, characterized in that the signals transmitted by the sighting head are light signals and in that the port-hole is made of glass.

4. The periscopic installation according to claim 1, characterized in that a single protection structure is provided for protecting all the masts.

5. The periscopic installation according to claim 1, characterized in that each mast is individually axially movable.

6. The periscopic installation according to claim 1, characterized in that the observation post is fixed and that an image derotator is provided associated with the observation post and adapted to maintain the image in a fixed plane when the mast and the corresponding sighting head rotate.

7. The periscopic installation according to claim 1, characterized in that the switching means comprise at least one mobile change of direction mirror.

* * * * *